United States Patent
Panchani et al.

(10) Patent No.: US 11,325,509 B2
(45) Date of Patent: May 10, 2022

(54) SEAT CUSHION-EXTENSION VENTILATION WITH PRIMARY FAN

(71) Applicant: Atieva, Inc., Newark, CA (US)

(72) Inventors: Virat Panchani, Fremont, CA (US); Ardavan Aliabadi, Union City, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 16/948,196

(22) Filed: Sep. 8, 2020

(65) Prior Publication Data
US 2022/0072981 A1    Mar. 10, 2022

(51) Int. Cl.
*B60N 2/56* (2006.01)
*B60N 2/02* (2006.01)
*B60N 2/30* (2006.01)

(52) U.S. Cl.
CPC ......... *B60N 2/5642* (2013.01); *B60N 2/0284* (2013.01); *B60N 2/30* (2013.01); *B60N 2/565* (2013.01)

(58) Field of Classification Search
CPC ................. B60N 2/62; B60N 2/0284; B60N 2002/0288; B60N 2/5642; B60N 2/565; B60N 2/5657; B60N 2/879
See application file for complete search history.

(56) References Cited

U.S. PATENT DOCUMENTS

| | | | | |
|---|---|---|---|---|
| 5,002,336 A | * | 3/1991 | Feher | B60N 2/879 |
| | | | | 297/180.13 |
| 9,333,889 B1 | * | 5/2016 | Cloutier | B60N 2/70 |
| 9,452,692 B1 | | 9/2016 | Rawlinson et al. | |
| 2014/0203599 A1 | * | 7/2014 | Line | B60N 2/5642 |
| | | | | 297/180.14 |
| 2015/0069811 A1 | * | 3/2015 | Sachs | B60N 2/995 |
| | | | | 297/423.1 |
| 2015/0140915 A1 | | 5/2015 | Rawlinson | |
| 2016/0207374 A1 | | 7/2016 | Gauthier et al. | |
| 2017/0028886 A1 | * | 2/2017 | Zhang | B60N 2/5657 |
| 2019/0092196 A1 | * | 3/2019 | Prozzi | B60N 2/5657 |
| 2020/0238873 A1 | * | 7/2020 | Akaike | B60N 2/5657 |

FOREIGN PATENT DOCUMENTS

| | | | | | |
|---|---|---|---|---|---|
| CN | 107804200 A | * | 3/2018 | ............ | B60N 2/914 |
| CN | 111741868 A | * | 10/2020 | ............... | A47C 7/34 |
| DE | 102006047370 A1 | * | 4/2008 | ........... | B60N 2/5642 |
| DE | 102010050772 A1 | * | 7/2011 | ............. | B60N 2/565 |

(Continued)

OTHER PUBLICATIONS

International Search Report and Written Opinion for PCT Application No. PCT/US2021/071387, dated Dec. 23, 2021, 12 pages.

*Primary Examiner* — Timothy J Brindley
(74) *Attorney, Agent, or Firm* — Brake Hughes Bellermann LLP

(57) ABSTRACT

A seat comprises: a seat cushion including a first mesh; a seat extension configured to move into a closed position and an extended position relative to the seat cushion, the seat extension including a second mesh; a first conduit forming a first air channel between the first and second meshes in the closed and extended positions; and a fan configured to draw air from the first and second meshes using the first conduit.

20 Claims, 6 Drawing Sheets

(56) References Cited

FOREIGN PATENT DOCUMENTS

| | | | | |
|---|---|---|---|---|
| DE | 202011050088 U1 | * | 7/2011 | ............. B62B 9/102 |
| DE | 202012010708 U1 | * | 11/2012 | ........... B60N 2/5642 |
| DE | 102012023908 A1 | * | 6/2014 | ............. B60N 2/565 |
| DE | 202018004424 U1 | * | 9/2019 | ........... B60N 2/5657 |
| EP | 0834420 A1 | * | 4/1998 | ........... B60N 2/5657 |
| FR | 2686299 A1 | * | 7/1993 | ........... B60N 2/5642 |
| FR | 2829728 A1 | * | 3/2003 | ........... B60N 2/5657 |
| KR | 20100034315 A | * | 4/2010 | |
| KR | 20110000061 U | * | 1/2011 | |
| KR | 20120045277 A | * | 5/2012 | ........... B60N 2/5635 |
| KR | 20150041568 A | * | 4/2015 | |
| KR | 20210064712 A | * | 6/2021 | |
| SE | 1850991 A1 | | 2/2020 | |
| WO | WO-2008058519 A1 | * | 5/2008 | ........... B60N 2/5657 |

* cited by examiner

SEAT CUSHION-EXTENSION VENTILATION WITH PRIMARY FAN

TECHNICAL FIELD

This document relates to seat cushion-extension ventilation with a primary fan.

BACKGROUND

When a person sits in an automotive seat (e.g., a seat of a car, truck, or other vehicle) for an extended period of time, he or she may experience certain discomfort with the seat cushion. For example, the person may find that the length of the seat cushion only supports a part of their upper legs, or that there is increased pressure on the legs at the front edge of the seat. This can lead to a less comfortable sitting position. So-called seat extensions have been proposed for these situations that can be selectively extended to increase the length of the seat cushion, thereby supporting more of the person's upper leg while seated.

An occupant in an automotive seat can also be subjected to increased temperature, for example in areas where the person's body is in contact with the surface of the seat. Such an increase in temperature can be unpleasant or uncomfortable if the occupant is a passenger, and can also interfere with the control of the vehicle if the occupant is the driver. Attempts to address the problem of increased temperature and/or sweating have been made by mounting a fan inside the seat cushion. When the seat includes a seat extension, some seats with fans have not provided any ventilation of the seat extension, which can lead to the discomfort/interference mentioned above. Other seats with fans have positioned a primary fan inside the seat cushion and an auxiliary fan in the seat extension. Such a solution may be undesirable due to one or more factors. For example, the extra fan, electrical harness, and control circuitry can increase the overall cost of the seat, and/or the mass of the vehicle. As other examples, the extra fan can increase the level of noise in the passenger cabin, and increase power consumption.

SUMMARY

In one aspect, a seat comprises: a seat cushion including a first mesh; a seat extension configured to move into a closed position and an extended position relative to the seat cushion, the seat extension including a second mesh; a first conduit forming a first air channel between the first and second meshes in the closed and extended positions; and a fan configured to draw air from the first and second meshes using the first conduit.

Implementations can include any or all of the following features. The first and second meshes are made from a common mesh material. The first conduit comprises a third mesh inside an air-impermeable layer. The first, second, and third meshes are made from a common mesh material. The first mesh has a width facing the seat extension, and wherein the first conduit is narrower than the width of the first mesh. The second mesh has a width facing the seat cushion, and wherein the first conduit is narrower than the width of the second mesh. The seat further comprises an air duct in the seat cushion, the air duct positioned between the first mesh and the fan. The seat is configured so that the fan draws at least about 8 cubic feet of air per minute from the first and second meshes. The first conduit is configured to deform when the seat extension moves between the closed and extended positions. The seat is configured so that the seat cushion and the seat extension are separated by a first gap when the seat extension is in the extended position, and so that the seat cushion and the seat extension are separated by a second gap when the seat extension is in the closed position, the second gap narrower than the first gap, and wherein the first conduit is configured to assume a folded position in the second gap in which at least a portion of the first conduit is folded in half. The seat further comprises a heating mat extending over the seat cushion and over the seat extension, and wherein the heating mat is configured to assume a folded position in the second gap in which a portion of the heating mat is folded in half. The seat cushion further includes a first pad positioned outward of the first mesh, and wherein the first pad does not extend into the first and second gaps. The seat extension further includes a second pad positioned outward of the second mesh, and wherein the second pad does not extend into the first and second gaps. The seat further comprises: a third mesh elsewhere than the first and second meshes; and a second conduit forming a second air channel between the first and third meshes, wherein the second conduit is static. The seat cushion includes the third mesh and the second conduit.

BRIEF DESCRIPTION OF DRAWINGS

Like reference symbols in the various drawings indicate like elements.

DETAILED DESCRIPTION

Figure 1:
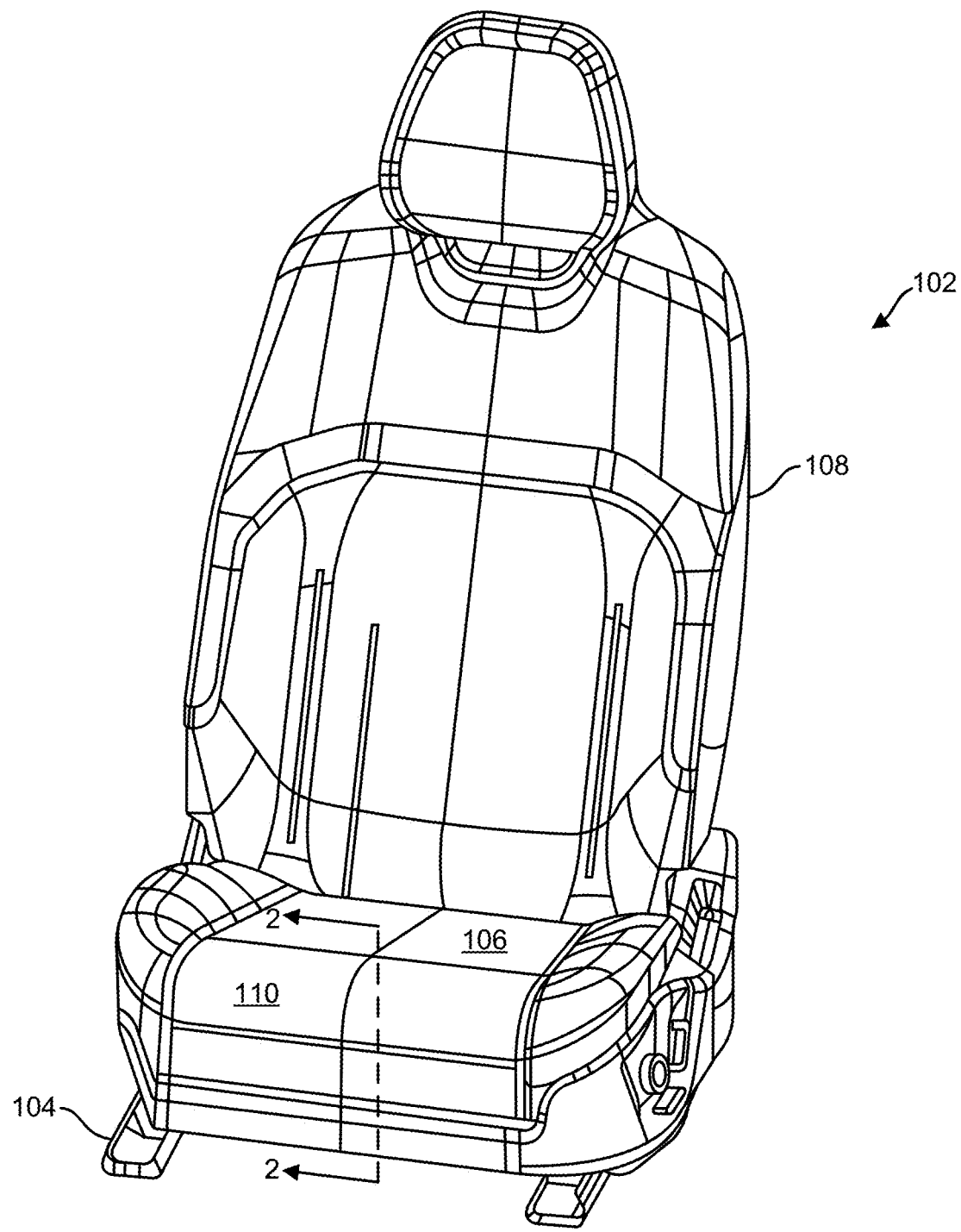
FIG. 1 shows an example of an automotive seat.

This document describes examples of systems and techniques for providing ventilation in at least a seat cushion and a seat extension of a seat. The ventilation can serve to cool the occupant by removing warm air, and also to make the occupant more comfortable by removing moisture from the occupant's sweating. Ventilation for the seat extension can be provided using the same fan as for the seat cushion, to eliminate the cost and complexity of using a separate fan for the moveable seat extension. For example, a single fan can be used to ventilate the seat cushion (sometimes referred to as a "primary fan") and can also ventilate the seat extension, thereby improving comfort.

Examples herein refer to a seat. A seat can be used in a vehicle, such as an automobile, truck, train, or aircraft, or elsewhere. A seat can have a base (e.g., a seat cushion) configured for supporting the majority of the weight of the occupant. A seat can have a seatback (e.g., a reclining or fixed seatback) configured for supporting the occupant in a sitting position or otherwise. The seat can have zero, one, or two armrests. The seat can have a head restraint (e.g., a headrest mounted at the top of the seatback). The seat can be provided with upholstery that presents a utility surface of one or more materials (sometime referred to as trim). The upholstery can further include one or more components designed to support the occupant's weight, including, but not limited to, springs, foam, pads, and/or a bladder. The seat can be provided with one or more safety features. For example, a restraint (e.g., a seat belt or a child seat) can be mounted on the seat or be attached to the vehicle's body. As another example, one or more airbags can be positioned at the seat (e.g., within the upholstery) and/or near the seat.

Examples herein refer to a seat extension. A seat extension is a portion of a seat that is selectively moveable so as to increase, decrease, or otherwise alter, the support that the seat provides the occupant. Any seat can have zero, one, or more seat extensions. A seat restraint can be coupled to (e.g., mounted to) a base of the seat, for example to the structural parts of a seat cushion. A seat restraint can be moveable between at least a closed position and an extended position. In some implementations, the seat restraint can be positioned closer to the seat cushion in the closed position than in the extended position. For example, this can be the case when the seat extension is configured to slide on a track. In some implementations, the seat restraint can be positioned further from the relevant portion of the occupant's body (e.g., a part of the leg) in the closed position than in the extended position. For example, this can be the case when the seat extension is configured to be rotated by way of a hinge.

Examples herein refer to a mesh where air is drawn from the mesh and/or passed through the mesh. A mesh includes strands of one or more materials that are connected to each other to form a three-dimensional structure that allows airflow in at least one direction. Any suitable type of material that allows air to pass can be used. At least one material can include a synthetic material and/or a natural material. A synthetic material can include a compound (e.g., a composite material), a polymer material (e.g., a plastic material, including fiberglass), and/or a ceramic material. A natural material can include natural fibers (e.g., plant-based or animal-based). As used herein, a mesh can include one or more materials that may also be referred to as a spacer fabric, a spacer knit, and/or a three-dimensional fabric. The mesh can have one or more shapes and/or orientations of strands that allows air to pass. The strands can be randomly oriented or arranged in one or more patterns. In the mesh, two or more strands can cross each other with or without being attached to (e.g., being integral with) each other. Strands can extend in any direction within the mesh. The structural properties of the mesh allow air to be drawn from the mesh and/or passed through the mesh also when the weight of an occupant is at least partially supported by the mesh.

Examples herein refer to one or more air-impermeable layers. An air-impermeable layer can be made from any material that sufficiently blocks or reduces the flow of air through the surface of the layer. In some implementations, an air-impermeable layer is characterized as having a specific (e.g., a range of) air permeance. For example, an air-impermeable layer such as air-impermeable tape may allow, given a specific pressure, at most a certain volume of air to traverse the layer per area unit and per unit of time. In some implementations, the air-impermeable layer is selected to have an air permeance that will give the ventilation system (e.g., as exemplified below) the ability to draw at least a specific amount of air per unit of time.

Examples herein refer to one or more fans. A fan is a machine that produces airflow. In some implementations, an axial fan and/or a centrifugal fan can be used. A fan can be driven by a dedicated electric motor, such as a direct-current (DC) motor that is powered by a vehicle's electrical system.

FIG. 1 shows an example of an automotive seat 100. The automotive seat 100 can be used with one or more other examples described elsewhere herein. The automotive seat 100 includes a body 102 that is positioned against (e.g., on top of) one or more tracks 104. The automotive seat 100 can be configured for use by one or more occupants of a vehicle. In some implementations, the automotive seat 100 can be positioned in a first row, or in a second row, or in a third or other row, of the vehicle. For example, the automotive seat 100 can be a driver seat or a passenger seat.

The automotive seat 100 includes a seat cushion 106 and a seatback 108 coupled to each other. For example, the seatback 108 can be fixed, or connected to the seat cushion 106 by one or more recliners. The automotive seat 100 includes a seat extension 110 adjacent the seat cushion 106. In some implementations, the seat extension 110 can be moved between two or more positions relative to the seat cushion 106. For example, the seat extension 110 can be moved along a track (not shown) to assume at least a closed position (e.g., as shown in the illustration) or an extended position (to be discussed below). The automotive seat 100 can be provided with a ventilation system as described in examples herein. In some implementations, the ventilation system allows the seat extension 110 and the seat cushion 106 to be ventilated using a single fan, such as a primary fan mounted within the seat cushion 106. For example, the ventilation system can have a mesh in the seat cushion 106 and a mesh in the seat extension 110, the meshes connected by a conduit that forms an air channel for drawing air from the meshes.

Figure 2A:
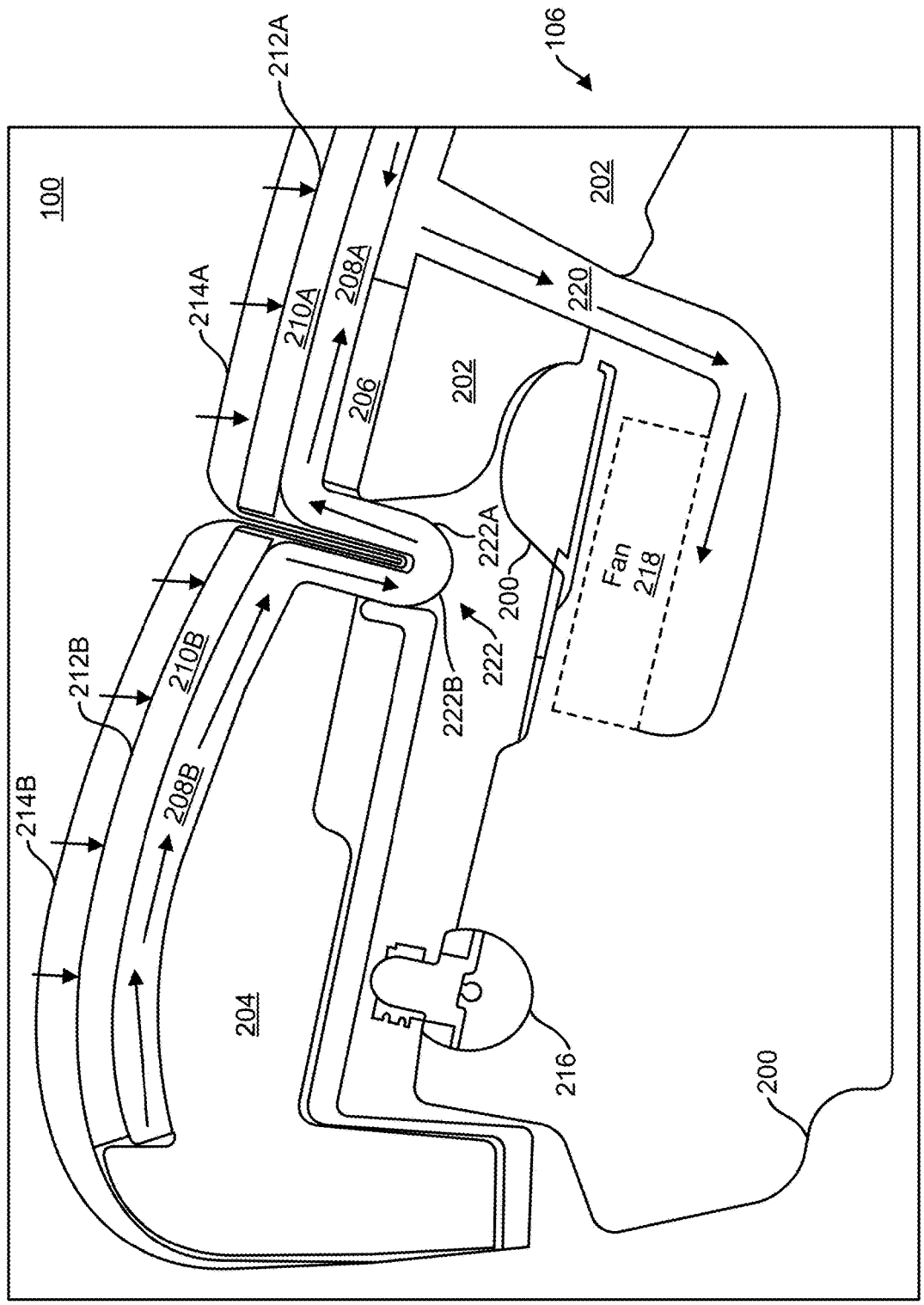
FIGS. 2A-2B show example cross-sections of the automotive seat in FIG. 1.
Figure 2B:
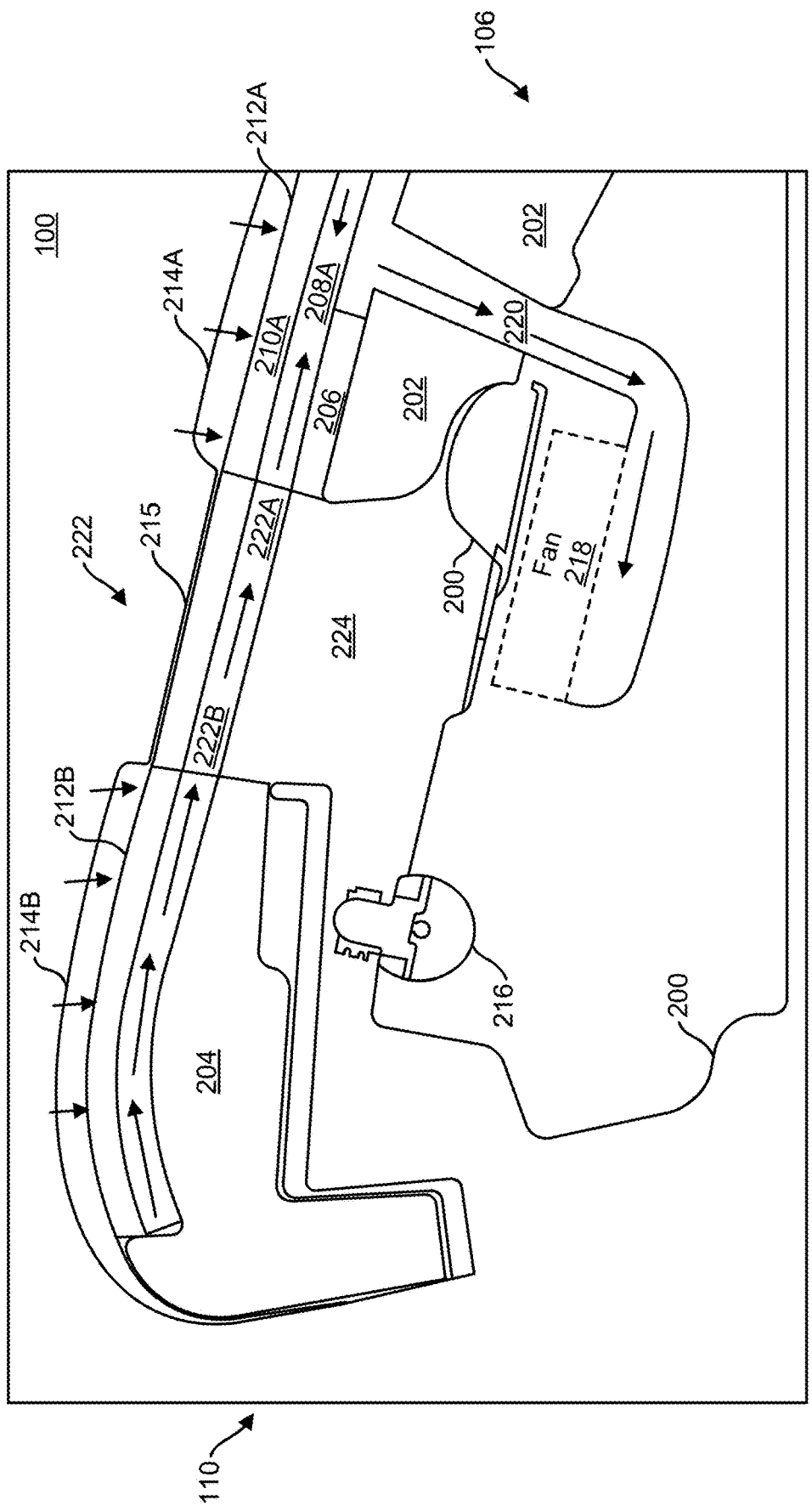

FIGS. 2A-2B show example cross-sections of the automotive seat 100 in FIG. 1. The examples described with reference to FIGS. 2A-2B can be used together with one or more other examples described elsewhere herein. In FIG. 2A, a portion of the seat cushion 106, and the seat extension 110, are shown in a closed position. The seat cushion 106 includes a base 200 which is schematically illustrated. In some implementations, the base 200 in configured to be placed against a portion of a vehicle body (e.g., positioned on the vehicle floor). For example, the base 200 can facilitate travel by the automotive seat 100 along a track fixed against the vehicle body.

The base 200 supports the seat cushion 106 and the seat extension 110, as well as other components of the automotive seat 100. The base 200 can include one or more pieces of foam 202, and the seat extension 110 can include one or more pieces of foam 204. The foams 202 and 204 can support at least part of the weight of the occupant (not shown) in the automotive seat 100. The base 200 can include one or more other components to increase occupant comfort. In some implementations, a massaging component 206 (here schematically illustrated using a rectilinear shape) can include one or more pneumatic massage bladders and a carrier plate to support the bladder(s). For example, such a carrier plate can include an opening to facilitate air flow, for example as will be described below.

The automotive seat 100 can include mesh 208A and mesh 208B that can provide ventilation for the occupant. In some implementations, the meshes 208A and 208B are part of one continuous member (e.g., a sheet) of mesh material. For example, the mesh 208A can be positioned at the seat cushion 106 (e.g., against or adjacent the foam 202, or the massaging component 206) and the mesh 208B can be positioned at the seat extension 110 (e.g., against or adjacent the foam 204). The mesh 208A can extend over an entire occupant-facing surface of the seat cushion 106, or over a part of such a surface. The mesh 208B can extend over an entire occupant-facing surface of the seat extension 110, or over a part of such a surface.

The automotive seat 100 can include one or more comfort pads to further enhance sitting comfort. Here, a comfort pad 210A is positioned at the seat cushion 106 (e.g., against or adjacent, such as outward of, the mesh 208A), and a comfort pad 210B is positioned at the seat extension 110 (e.g., against or adjacent, such as outward of, the mesh 208B). The comfort pad 210A can extend over at least part of the surface of the mesh 208A. The comfort pad 210B can extend over at least part of the surface of the mesh 208B. In some implementations, the mesh 208A and/or the mesh 208B can be positioned in a cutout (e.g., a portion deliberately left free of material) of the corresponding comfort pad 210A or 210B.

The automotive seat 100 can include one or more heating mats to provide heating for the occupant. Here, a heating mat 212A is positioned at the seat cushion 106 (e.g., against or adjacent the comfort pad 210A), and a heating mat 212B is positioned at the seat extension 110 (e.g., against or adjacent the comfort pad 210B). The heating mat 212A can extend over at least part of the surface of the comfort pad 210A. The heating mat 212B can extend over at least part of the surface of the comfort pad 210B.

The automotive seat 100 can include one or more trims on surfaces intended to face the occupant. Here, a trim 214A is positioned at the seat cushion 106 (e.g., against or adjacent the heating mat 212A), and a trim 214B is positioned at the seat extension 110 (e.g., against or adjacent the heating mat 212B). One or both of the trims 214A and 214B can include one or more seat coverings (e.g., leather or a synthetic material such as polyvinyl chloride), and one or more pieces of foam or a lamination material.

The automotive seat 100 can include a motor 216. In some implementations, the motor 216 can act on the seat extension 110 to move the seat extension between at least a closed position (e.g., as shown in FIG. 2A) and an extended position (e.g., as shown in FIG. 2B). For example, the motor 216 can be a DC motor powered by the electric system of the vehicle.

The automotive seat 100 can include a fan 218, here schematically illustrated using a dashed outline. The fan 218 can be considered a primary fan for the automotive seat 100. In some implementations, the fan 218 is positioned in or adjacent the seat cushion 106 (e.g., within the base 200). For example, the fan 218 is driven by a DC motor powered by the electric system of the vehicle. The fan 218 can be oriented in any of multiple different directions. In some implementations, a rotation axis of the fan 218 extends in the plane of the drawing. For example, the rotation axis can be oriented substantially in a vertical direction.

The automotive seat 100 can include an air duct 220. The air duct 220 can be a separate component made of any suitable material (e.g., plastic or metal), or can be formed by creating a passage in another component of the automotive seat 100. In some implementations, the air duct 220 extends through at least part of the seat cushion 106 (e.g., from the base 200 and through the foam 202), to facilitate air flow between the fan 218 and the meshes 208A-208B. In some implementations, the air duct 220 can be positioned between the fan 218 and the mesh 208A. For example, the air duct can extend through, or terminate adjacent, an opening in a carrier plate for the massaging component 206. The air duct 220 can have any of multiple different cross-sectional shapes (e.g., circular or rectangular) and can be relatively straight or make one or more turns.

The fan 218 will provide ventilation of the automotive seat 100 by drawing air from the meshes 208A-208B. To facilitate air flow between the meshes 208A-208B, the automotive seat 100 includes a conduit 222. In some implementations, the conduit 222 includes a portion of mesh that is merged, joined, or otherwise connected at each of its ends with the mesh 208A and the mesh 208B, respectively. In some implementations, the conduit 222 includes mesh 222A positioned toward the mesh 208A, and mesh 222B positioned toward the mesh 208B. For example, the meshes 208A, 222A, 222B, and 208B can be formed as one integral portion of mesh material (i.e., a common mesh material) having an appropriate length. As another example, the meshes 222A-222B can constitute a separate mesh portion that is attached to the mesh 208A at one of its ends, and to the mesh 208B and its other end.

In this example, the seat extension 110 of the automotive seat 100 is in a closed (e.g., non-extended) position, and the conduit 222 is currently shown as folded in half (the folding being done substantially in the plane of the drawing). That is, the seat extension 110 and the seat cushion 106 are separated by a gap when the seat extension 110 of the automotive seat 100 is in the closed position. Here, the conduit 222 extends into that gap and occupies substantially the entire width thereof. Also, the heating mats 212A and 212B are here part of a continuous heating mat that extends along the conduit 222 into the gap between the seat extension 110 and the seat cushion 106. As such, a portion of the continuous heating mat here also assumes a folded position where the portion is folded in half at the conduit 222. The trims 214A and 214B form a continuous trim in this example, and extend along the conduit 222 into the gap between the seat extension 110 and the seat cushion 106. For example, the trims 214A and 214B are connected to each other via a fold 215 that is created by sewing portions of the trims 214A and 214B to each other. The fold 215 hides underlying mechanisms and seat parts, and opens when the seat extension 110 is extended. However, in this example neither of the comfort pads 210A or 210B extends along the conduit 222 or into the gap between the seat extension 110 and the seat cushion 106.

That is, a ventilation system here includes at least the meshes 208A-208B, the conduit 222, the air duct 220, and the fan 218. The air that the fan 218 draws from the meshes 208A-208B is here schematically illustrated as arrows entering the trims 214A-214B from above; arrows traveling along a length of the meshes 208A-208B; arrows traveling through the conduit 222; and arrows traveling through the air duct 220. For the comfort of the occupant (not shown) sitting in the automotive seat 100, such a ventilation system should provide at least enough airflow to remove a sufficient amount of air from the envelope surrounding the occupant's contact with the automotive seat 100. The required capacity of the ventilation system can depend on multiple factors, including, but not limited to, external climate or weather parameters such as ambient temperature and amount of sunlight; the capacity of the overall heating, ventilation, and air conditioning (HVAC) system of the vehicle; the shape and surface materials of the seat cushion 106 and the seat extension 110; and the personal preferences of the occupant. In some implementations, the meshes 208A-208B and the conduit 222 are made of a polymer-based material, and the fan 218 is a centrifugal fan drawing in air from the air duct 220 at the sides and ejecting the air in a substantially horizontal direction. For example, such a ventilation system can provide an airflow of at least about 8 cubic feet per minute (CFM) when a standard-size occupant dummy (e.g., 5'10" tall, 172 lbs.) is sitting in the automotive seat 100. As a comparison, when the automotive seat 100 is unoccupied, the ventilation system can provide an airflow of at least about 10 CFM.

Turning now to FIG. 2B, the seat extension 110 has here been moved relative to the seat cushion 106 and has assumed an extended position. For example, the motor 216 advances the seat extension along a track, and/or rotates the seat extension 110. The conduit 222 can be configured to deform when the seat extension 110 moves between the closed position and the extended position. For example, the deformation can involve folding substantially in half (e.g., when approaching the closed position), or unfolding into a substantially planar configuration (e.g., when approaching the extended position). The seat extension 110 and the seat cushion 106 are separated by a gap 224 when the seat extension 110 of the automotive seat 100 is in the extended position (e.g., as shown here). The gap that exists in FIG. 2A (in which the conduit 222 is substantially folded in half) is narrower than the gap 224.

The above examples illustrate that a seat (e.g., the automotive seat 100) can include a seat cushion (e.g., the seat cushion 106) including a first mesh (e.g., the mesh 208A). The seat extension can be configured to move into a closed position (e.g., as shown in FIG. 2A) and an extended position (e.g., as shown in FIG. 2B) relative to the seat cushion. The seat extension can include a second mesh (e.g., the mesh 208B). The seat can include a conduit (e.g., the conduit 222) forming an air channel between the first and second meshes in the closed and extended positions. The seat can include a fan (e.g., the fan 218) configured to draw air from the first and second meshes using the conduit.

Figure 3:
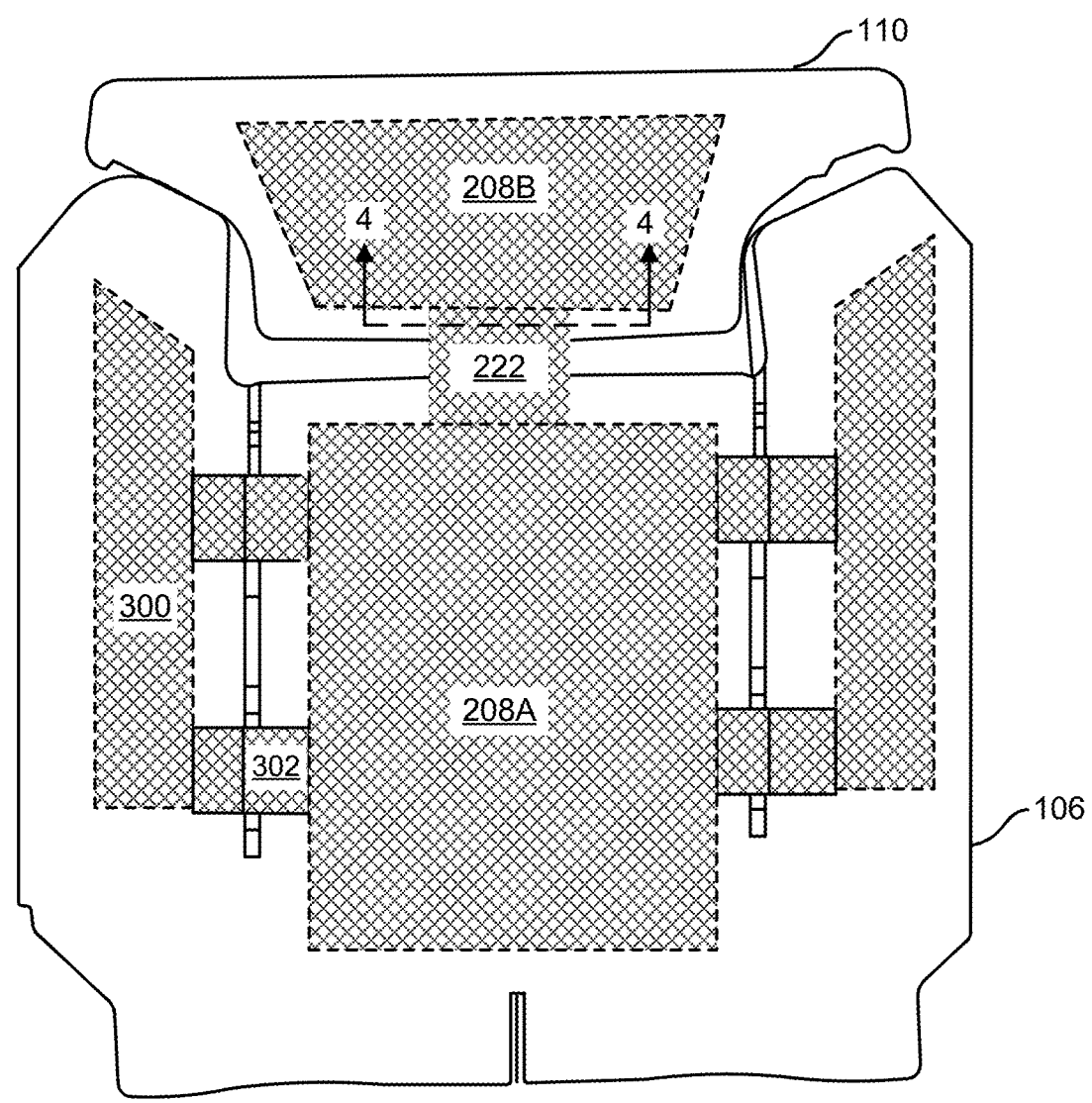
FIG. 3 shows an example of the seat cushion and the seat extension in the automotive seat of FIG. 1.

FIG. 3 shows an example of the seat cushion 106 and the seat extension 110 in the automotive seat 100 of FIG. 1. The seat cushion 106 includes the mesh 208A. In some implementations, the mesh 208A can occupy most of the area of the seat cushion 106. For example, the mesh 208A can have substantially a rectangular shape, or another shape. In some implementations, the mesh 208A can have a relatively greater size where the occupant is more in contact with the seat cushion 106. For example, it can be more important to provide cooling and/or remove moisture (e.g., sweat) in areas of greater contact. In some implementations, an area of the mesh 208A near the occupant's back and/or buttocks can be relatively larger than an area near the occupant's thighs. The seat extension 110 includes the mesh 208B. In some implementations, the mesh 208B can occupy most of the area of the seat extension 110. For example, the mesh 208B can have substantially a trapezoid shape, or another shape. The seat extension 110 is currently in the extended position. For example, the conduit 222 that forms an air channel between the meshes 208A-208B is currently in a substantially planar configuration.

The conduit 222 can have any of multiple sizes and/or shapes. In some implementations, the conduit 222 has a substantially rectangular shape. The mesh 208A here has a specific width along an edge facing the seat extension 110. In some implementations, the conduit 222 is narrower than (e.g., less than half of) that width of the mesh 208A. Similarly, the mesh 208B here has a specific width along an edge facing the seat cushion 106. In some implementations, the conduit 222 is narrower than (e.g., less than half of) that width of the mesh 208B. There can be multiple conduits forming multiple channels; for example, two in parallel spaced apart.

The automotive seat 100 can have one or more additional meshes connected by additional conduit(s). In some implementations, a conduit can be considered a static conduit because it is not configured to be moved (e.g., to deform) to accommodate a moving seat extension. Here a mesh 300 is positioned elsewhere than at the mesh 208A or 208B (e.g., to the side of the mesh 208A from the occupant's perspective). The mesh 300 can be coupled to the mesh 208A by an air channel formed by at least one conduit 302 which can be considered a static conduit. The mesh 300 can be included in the seat cushion 106, for example as illustrated.

Figure 4:
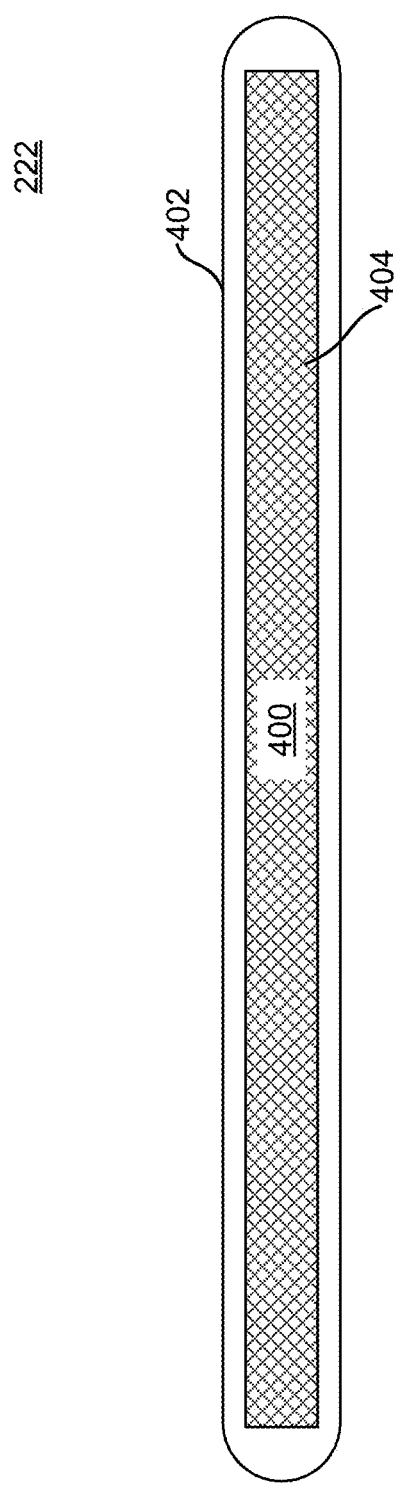
FIG. 4 shows an example cross-section of the conduit in FIG. 3.

FIG. 4 shows an example cross-section of the conduit 222 in FIG. 3. The conduit 222 here includes a mesh 400 surrounded by an air-impermeable layer 402. In some implementations, the mesh 400 includes the same material as one or more other meshes in the automotive seat 100. For example, the mesh 400 and the meshes 208A-208B (FIGS. 2A-2B) can be formed as a contiguous piece of mesh material. The mesh can include one or more types of strands 404, which are here schematically illustrated using cross hatching. The strands 404 can be straight, or have sinuous shapes, or have otherwise periodic shapes, or have random shapes, to name just a few examples. In some implementations, the strands 404 can extend in two or more directions in form of a three-dimensional matrix, three-dimensional web, or other three-dimensional structure, thereby forming an air channel than can convey airflow.

The air-impermeable layer 402 can substantially cover the periphery of the mesh 400. In some implementations, the air-impermeable layer 402 is formed by winding an air-impermeable adhesive strip (e.g., a tape or other film) in one or more layers about the mesh 400. The air-impermeable layer 402 can also be used for attaching the conduit to the meshes 208A-208B (FIGS. 2A-2B) at either end.

Figure 5:
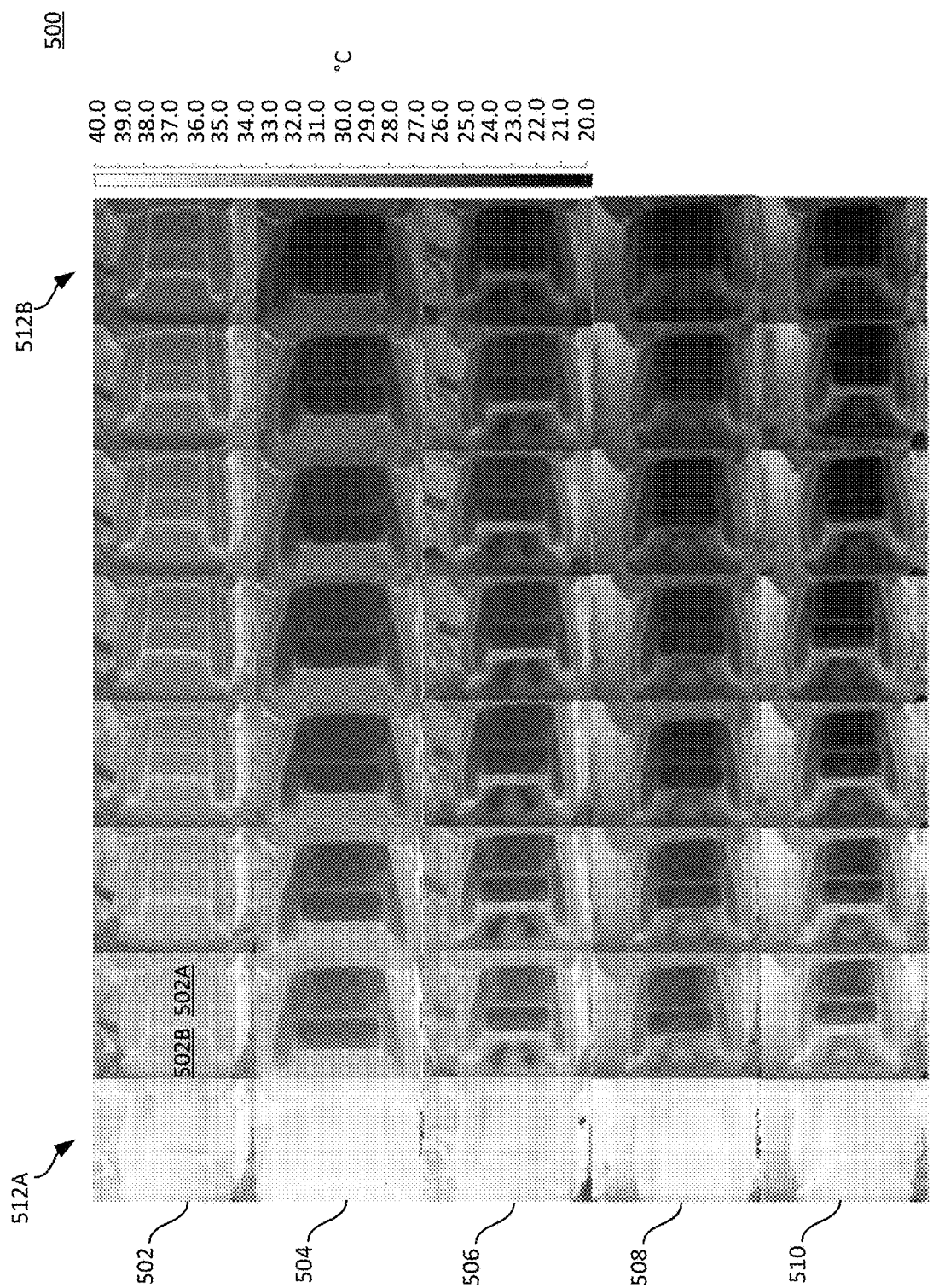
FIG. 5 shows examples of thermal scans for automotive seats.

FIG. 5 shows examples of thermal scans 500 for automotive seats. The thermal scans 500 can be generated for one or more implemented embodiments, including, but not limited to, for the automotive seat 100 in FIG. 1, and for one or more other types of seats. The thermal scans 500 here include rows 502-510, each row corresponding to a separate type of seat, or configuration of a seat. More specifically, a seat cushion and a seat extension are visible for each of the types of seats in the rows 502-510, and a seat cushion 502A and a seat extension 502B are indicated in the row 502 for illustration. Particularly, the row 502 corresponds to a seat where the seat extension is currently in a closed position, and where the seat has no active ventilation system (i.e., no fan inside the seat). The row 504 corresponds to a seat where the seat extension is currently in a closed position, and where the seat cushion has a fan but where no ventilation is provided to the seat extension. The row 506 corresponds to a seat where the seat extension is currently in a closed position, and where the seat cushion has a fan and where the seat extension has a separate fan. The rows 508 and 510, finally, correspond to seats that are present embodiments, and where the same fan is used for ventilating the seat cushion and the seat extension. In the row 508, the seat extension is in a closed position, and in the row 510 the seat extension is in an extended position.

The thermal scans 500 were generated by placing the different types of seats, or a seat in different configurations, inside a thermal chamber. Particularly, at the beginning of the sequence in each of the rows 502-510, the chamber had an internal temperature of about 40° C., and the seat had been allowed to substantially reach thermal equilibrium with the air inside the thermal chamber.

Each of the rows 502-510 includes a sequence of images captured with a thermal scanner over a period of time, including respective first images 512A and respective last images 512B. The next image may have been captured about one or more minutes after the preceding image. The temperature in each of the images is represented by shade, as indicated by a temperature scale that here ranges between about 20° C. and about 40° C. At the time corresponding to the first images 512A, no heating was applied to the thermal chamber. In the seat types that had at least one fan (that is, the seats to which the rows 504-510 correspond), the fan or fans were turned on at about the time of capturing the first images 512A, and were kept running during the time when the respective images were captured.

The images in the row 502 can be characterized as a baseline that indicates the temperature distribution in a seat without ventilation. The images in the row 504 indicate that a seat extension having no ventilation will remain considerably warmer than a ventilated seat cushion. The images in the row 506 indicate that the seat extension becomes somewhat cooler when it has a separate fan. However, such an approach can be associated with higher cost, increased complexity, increased noise, and a greater mass of the vehicle. Moreover, the relatively limited space available in the seat extension can place design constraints on the size and capacity of a fan being installed in the seat extension.

The images in the rows 508 and 510 illustrate that present embodiments can provide advantageous ventilation of a seat extension. The ventilation can be superior to that obtained using a separate fan for the seat extension. For example, the temperature of the seat extension in the last image 512B of the row 508, and the temperature of the seat extension in the last image 512B of the row 510, are both considerably lower, and more evenly distributed, than the temperature of the seat extension in the last image 512B of the row 506. Moreover, applying seat-extension ventilation as described herein can reduce the extra cost, complexity, noise, and mass that may otherwise occur.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A seat comprising:
a seat cushion including a first mesh;
a seat extension configured to move into a closed position and an extended position relative to the seat cushion, the seat extension including a second mesh;
a first conduit forming a first air channel between the first and second meshes in the closed and extended positions, wherein the first conduit comprises a third mesh inside an air-impermeable layer; and
a fan configured to draw air from the first and second meshes using the first conduit.

2. The seat of claim 1, wherein the first and second meshes are made from a common mesh material.

3. The seat of claim 1, wherein the first, second, and third meshes are made from a common mesh material.

4. The seat of claim 1, wherein the first mesh has a width along an edge of the first mesh, the edge facing the seat extension, and wherein the first conduit is narrower than the width of the first mesh.

5. The seat of claim 1, wherein the second mesh has a width along an edge of the second mesh, the edge facing the seat cushion, and wherein the first conduit is narrower than the width of the second mesh.

6. The seat of claim 1, further comprising an air duct in the seat cushion, the air duct positioned between the first mesh and the fan.

7. The seat of claim 1, wherein the seat is configured so that the fan draws at least about 8 cubic feet of air per minute from the first and second meshes.

8. The seat of claim 1, wherein the first conduit is configured to deform when the seat extension moves between the closed and extended positions.

9. The seat of claim 1, wherein the seat extension is configured to at least partially support an occupant's legs.

10. The seat of claim 1, wherein each of the first, second, and third meshes includes strands of one or more materials connected to each other to form a three-dimensional structure.

11. A seat comprising:
a seat cushion including a first mesh;
a seat extension configured to move into a closed position and an extended position relative to the seat cushion, the seat extension including a second mesh;
a first conduit forming a first air channel between the first and second meshes in the closed and extended positions; and
a fan configured to draw air from the first and second meshes using the first conduit;
wherein the first conduit is configured to deform when the seat extension moves between the closed and extended positions; and
wherein the seat is configured so that the seat cushion and the seat extension are separated by a first gap when the seat extension is in the extended position, and so that the seat cushion and the seat extension are separated by a second gap when the seat extension is in the closed position, the second gap narrower than the first gap, and wherein the first conduit is configured to assume a folded position in the second gap in which at least a portion of the first conduit is folded in half.

12. The seat of claim 11, further comprising a heating mat extending over the seat cushion and over the seat extension, and wherein the heating mat is configured to assume a folded position in the second gap in which a portion of the heating mat is folded in half.

13. The seat of claim 12, wherein the seat cushion further includes a first pad positioned outward of the first mesh, and wherein the first pad does not extend into the first and second gaps.

14. The seat of claim 13, wherein the seat extension further includes a second pad positioned outward of the second mesh, and wherein the second pad does not extend into the first and second gaps.

15. A seat comprising:
a seat cushion including a first mesh;
a seat extension configured to move into a closed position and an extended position relative to the seat cushion, the seat extension including a second mesh;
a first conduit forming a first air channel between the first and second meshes in the closed and extended positions;
a fan configured to draw air from the first and second meshes using the first conduit;
a third mesh elsewhere than the first and second meshes; and
a second conduit forming a second air channel between the first and third meshes, wherein the second conduit is static.

16. The seat of claim 15, wherein the seat cushion includes the third mesh and the second conduit.

17. The seat of claim 11, wherein the first conduit comprises a third mesh inside an air-impermeable layer.

18. The seat of claim 11, further comprising:
a third mesh elsewhere than the first and second meshes; and
a second conduit forming a second air channel between the first and third meshes, wherein the second conduit is static.

19. The seat of claim 15, wherein the first conduit comprises a third mesh inside an air-impermeable layer.

20. The seat of claim 15, wherein the first conduit is configured to deform when the seat extension moves between the closed and extended positions, and wherein the seat is configured so that the seat cushion and the seat extension are separated by a first gap when the seat extension is in the extended position, and so that the seat cushion and the seat extension are separated by a second gap when the seat extension is in the closed position, the second gap narrower than the first gap, and wherein the first conduit is configured to assume a folded position in the second gap in which at least a portion of the first conduit is folded in half.

* * * * *